United States Patent
Kaneko et al.

(10) Patent No.: US 8,377,596 B2
(45) Date of Patent: Feb. 19, 2013

(54) NONAQUEOUS-TYPE ELECTROLYTE SOLUTION, AND DEVICE COMPRISING THE SAME

(75) Inventors: Shinako Kaneko, Sagamihara (JP); Hitoshi Ishikawa, Sagamihara (JP); Yasutaka Kono, Sagamihara (JP); Yoko Hashizume, Sagamihara (JP)

(73) Assignee: NEC Energy Devices, Ltd., Kanagawa (JP)

( * ) Notice: Subject to any disclaimer, the term of this patent is extended or adjusted under 35 U.S.C. 154(b) by 0 days.

(21) Appl. No.: 13/504,660

(22) PCT Filed: Oct. 19, 2010

(86) PCT No.: PCT/JP2010/068359
§ 371 (c)(1),
(2), (4) Date: Apr. 27, 2012

(87) PCT Pub. No.: WO2011/052428
PCT Pub. Date: May 5, 2011

(65) Prior Publication Data
US 2012/0219865 A1  Aug. 30, 2012

(30) Foreign Application Priority Data
Oct. 28, 2009 (JP) ................. 2009-247185

(51) Int. Cl.
*H01M 10/40* (2006.01)
*H01G 9/038* (2006.01)
(52) U.S. Cl. ......... 429/303; 429/200; 429/324; 429/338
(58) Field of Classification Search .................. None
See application file for complete search history.

(56) References Cited

U.S. PATENT DOCUMENTS

2010/0119956 A1* 5/2010 Tokuda et al. ................ 429/338
2010/0310942 A1* 12/2010 Watanabe et al. ............. 429/330

FOREIGN PATENT DOCUMENTS

| JP | 06-013108 A | 1/1994 |
| JP | 11-144757 A | 5/1999 |
| JP | 2001-217005 A | 8/2001 |
| JP | 2001-217007 A | 8/2001 |
| JP | 2006-024380 A | 1/2006 |
| JP | 2007-173147 A | 7/2007 |
| JP | 2008-041413 A | 2/2008 |
| JP | 2010-015719 A | 1/2010 |
| JP | 2010-050021 A | 3/2010 |

OTHER PUBLICATIONS

International Search Report of PCT/JP2010/068359 dated Jan. 18, 2011.

* cited by examiner

*Primary Examiner* — John S Maples
(74) *Attorney, Agent, or Firm* — Sughrue Mion, PLLC

(57) ABSTRACT

There are provided a nonaqueous-type electrolyte solution having high flame retardancy and a good capacity retention rate, and a device comprising the nonaqueous-type electrolyte solution. The nonaqueous-type electrolyte solution is used in a device comprising a positive electrode, a negative electrode and the nonaqueous-type electrolyte solution, and contains a lithium salt and a compound having a phosphazene structure, and further contains 0.05% by mass or more and 12.0% by mass or less of at least one disulfonate ester selected from a cyclic disulfonate ester and a chain disulfonate ester based on the total of the nonaqueous-type electrolyte solution.

4 Claims, 3 Drawing Sheets

NONAQUEOUS-TYPE ELECTROLYTE SOLUTION, AND DEVICE COMPRISING THE SAME

CROSS REFERENCE TO RELATED APPLICATIONS

This application is a National Stage of International Application No. PCT/JP2010/068359 filed Oct. 19, 2010, claiming priority based on Japanese Patent Application No. 2009-247185 filed Oct. 28, 2009, the contents of all of which are incorporated herein by reference in their entirety.

TECHNICAL FIELD

The present exemplary embodiment relates to a nonaqueous-type electrolyte solution, and a device having the same.

BACKGROUND ART

Since lithium ion secondary batteries can achieve high energy densities among devices such as lithium ion secondary batteries and capacitors, these attract attention as power sources for cell phones and laptop computers, and also as large power sources for electricity storage and power sources for automobiles.

Although lithium ion secondary batteries can achieve high energy densities, up-sizing makes the energy density gigantic, and higher safety is demanded. For example, in large power sources for electricity storage and power sources for automobiles, especially high safety is demanded, and as safety measures, there are applied the structural design of cells, packages and the like, protection circuits, electrode materials, additives having an overcharge protection function, the reinforcement of shutdown function of separators, and the like.

Lithium ion secondary batteries use aprotic solvents such as cyclic carbonates and chain carbonates as electrolyte solvents; and these carbonates are characterized by having a low flash point and being combustible though having a high dielectric constant and a high ionic conductivity.

One means of further enhancing the safety of lithium ion secondary batteries is making electrolyte solutions flame-retardant. As a technique for making electrolyte solutions flame-retardant, methods of adding a phosphazene compound as a flame retardant are disclosed.

For example, a nonaqueous electrolyte battery of Patent Literature 1 uses a solution in which a lithium salt is dissolved in a phosphazene derivative as the electrolyte, or a solution in which a lithium salt is dissolved in a solvent in which an aprotic organic solvent is further added in a phosphazene derivative. It is disclosed that thereby there arises no danger such as burst and ignition even in abnormal cases such as short circuits and that the excellent battery performance can be achieved.

A nonaqueous electrolyte battery of Patent Literature 2 uses a solution in which a lithium salt is dissolved in a chain-type phosphazene derivative as the electrolyte, or a solution in which a lithium salt is dissolved in a solvent in which an aprotic organic solvent is further added in a phosphazene derivative. It is disclosed that thereby there arises no danger such as burst and ignition even in abnormal cases such as short circuits and that the excellent battery characteristics can be achieved.

Patent Literature 3 describes a nonaqueous-type electrolyte solution secondary battery which has a positive electrode, a negative electrode, and a nonaqueous-type electrolyte solution containing a supporting salt, an organic solvent and a phosphazene derivative, wherein the potential window of the phosphazene derivative is in the range of a lower-limit value of +0.5 V or lower and an upper-limit value of +4.5 V or higher, and the potential window of the organic solvent is in a broader range than that of the phosphazene derivative.

Patent Literature 4 describes a nonaqueous-type electrolyte solution secondary battery which has a positive electrode, a negative electrode, and a nonaqueous-type electrolyte solution containing a supporting salt and a phosphazene derivative whose lithium salt solution (0.5 mol/l) has a conductivity of at least 2.0 mS/cm.

A technology is known which uses, as an additive, a substance reductively degraded at a higher potential than those of carbonates used as electrolyte solution solvents and forming an SEI (Solid Electrolyte Interface) being a protection membrane having a high lithium ion permeability. It is known that since the SEI has large effects on the charge/discharge efficiency, the cycle characteristics and the safety, control of the SEI at a negative electrode is essential, and the irreversible capacity of carbon materials and oxide materials can be reduced by the SEI.

Patent Literature 5 describes provision of an excellent nonaqueous-type electrolyte solution containing a lithium salt and a nonaqueous solvent, which can secure the safety and reliability in abnormal heating and the like of a battery and can also provide good battery performance such as cycle characteristics by further incorporation of a cyclic carbonate ester having a carbon-carbon unsaturated bond in the molecule and 1% by mass or more and 25% by mass or less of a phosphazene derivative based on the nonaqueous-type electrolyte solution.

A nonaqueous-type electrolyte solution for a battery disclosed in Patent Literature 6 contains a nonaqueous solution containing a cyclic phosphazene compound and a difluorophosphate ester compound, and at least one cyclic sulfur compound selected from the group consisting of 1,3-propanesultone, 1,3-butanesultone, 1,4-butanesultone and 1,3,2-dioxathiolane-2,2-dioxide, and a supporting salt. It is disclosed that the excellent battery performance and high safety even in a high-temperature environment are thereby imparted to the battery.

CITATION LIST

Patent Literature

Patent Literature 1: JP6-13108A
Patent Literature 2: JP11-144757A
Patent Literature 3: JP2001-217005A
Patent Literature 4: JP2001-217007A
Patent Literature 5: JP2006-24380A
Patent Literature 6: JP2008-41413A

SUMMARY OF INVENTION

Technical Problem

However, in Patent Literatures 1 to 4 and 6, since the phosphazene compounds are gradually reductively degraded on negative electrodes during long-term use, the capacity retention rates of the batteries greatly decrease in some cases.

In Patent Literature 5, although addition of vinylene carbonate capable of forming an SEI suppresses the reductive degradation of the phosphazene compound, addition of the vinylene carbonate in an enough amount to suppress the reductive degradation of the phosphazene compound over a long period causes an increase in resistance, greatly decreasing charge/discharge characteristics of the battery in some cases.

Further, in the case where the phosphazene compound and the difluorophosphate ester are degraded over a long period, a decrease in the presence rate of a flame retardant in the electrolyte solution reduces, in some cases, the safety after long-term usage. That is, in the case where a flame retardant to be reductively degraded is added, an amount of the additive corresponding to the amount of the flame retardant added is needed, and therefore, the resistance of the battery greatly increases, and the capacity and the rate characteristics sharply decrease in some cases.

That is, an object of the present exemplary embodiment is to provide a nonaqueous-type electrolyte solution having high flame retardancy and a good capacity retention rate, and a device including the nonaqueous-type electrolyte solution.

Solution to Problem

The nonaqueous-type electrolyte solution according to the present exemplary embodiment is one used in a device including a positive electrode, a negative electrode and the nonaqueous-type electrolyte solution, and contains a lithium salt and a compound having a phosphazene structure represented by the following formula (1), and further contains 0.05% by mass or more and 12.0% by mass or less of at least one disulfonate ester selected from a cyclic disulfonate ester represented by the following formula (2) and a chain disulfonate ester represented by the following formula (3) based on the total of the nonaqueous-type electrolyte solution.

[Formula 1]

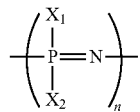

(1)

wherein in the formula (1), $X_1$ and $X_2$ each independently denote a halogen element or a monovalent substituent; the monovalent substituent denotes an alkyl group, an alkoxy group, an aryl group, an acyl group, an aryloxy group, an amino group, an alkylthio group, an arylthio group, a halogenated alkyl group, a halogenated alkoxy group, a halogenated aryl group, a halogenated acyl group, a halogenated aryloxy group, a halogenated amino group, a halogenated alkylthio group, or a halogenated arylthio group; n denotes an integer of 3 or more and 5 or less; and the formula (1) may be cyclic.

[Formula 2]

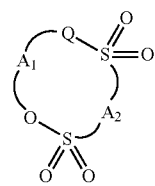

(2)

wherein in the formula (2), Q denotes an oxygen atom, a methylene group or a single bond; $A_1$ denotes a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and $A_2$ denotes a substituted or unsubstituted alkylene group which may be branched.

[Formula 3]

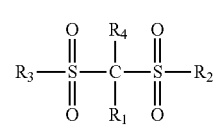

(3)

wherein in the formula (3), $R_1$ and $R_4$ each independently denote an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_{11}$ (wherein $X_{11}$ is a substituted or unsubstituted alkyl group having 1 to 5 carbon atoms), —$SY_{11}$ (wherein $Y_{11}$ is a substituted or unsubstituted alkyl group having 1 to 5 carbon atoms), —COZ (wherein Z is a hydrogen atom or a substituted or unsubstituted alkyl group having 1 to 5 carbon atoms) and a halogen atom; and $R_2$ and $R_3$ each independently denote an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_{12}X_{13}$ (wherein $X_{12}$ and $X_{13}$ are each independently a hydrogen atom or a substituted or unsubstituted alkyl group having 1 to 5 carbon atoms) and —$NY_{12}CONY_{13}Y_{14}$ (wherein $Y_{12}$ to $Y_{14}$ are each independently a hydrogen atom or a substituted or unsubstituted alkyl group having 1 to 5 carbon atoms).

In the nonaqueous-type electrolyte solution according to the present exemplary embodiment, part of the disulfonate ester contained in the nonaqueous-type electrolyte solution is substituted with a sultone compound represented by the following formula (4).

[Formula 4]

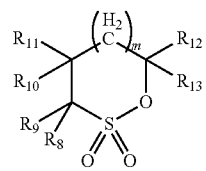

(4)

wherein in the formula (4), $R_8$ to $R_{13}$ each independently denote an atom or a group selected from a hydrogen atom, an alkyl group having 1 or more and 12 or fewer carbon atoms, a cycloalkyl group having 3 or more and 6 or fewer carbon atoms, and an aryl group having 6 or more and 12 or fewer carbon atoms; and m denotes an integer of 0 or more and 2 or less.

In the nonaqueous-type electrolyte solution according to the present exemplary embodiment, the nonaqueous-type electrolyte solution contains 3.0% by mass or more and 20.0% by mass or less of the compound having a phosphazene structure based on the total of the nonaqueous-type electrolyte solution.

In the nonaqueous-type electrolyte solution according to the present exemplary embodiment, the nonaqueous-type electrolyte solution is gelated with a polymer.

The device according to the present exemplary embodiment is a lithium ion secondary battery or a capacitor, and includes the nonaqueous-type electrolyte solution.

Advantageous Effects of Invention

According to the present exemplary embodiment, incorporation of a specific disulfonate ester having a large suppressing effect on the reductive degradation of a compound having a phosphazene structure can suppress the reductive degradation of a compound having a phosphazene structure on a negative electrode active material. Thereby, an increase in the resistance due to the reductive degradation of a compound having a phosphazene structure can be suppressed, and a good capacity retention rate can be attained over a long period. Further according to the present exemplary embodiment, since the reduction of a compound having a phosphazene structure can be suppressed over a long period and an effective amount of the compound having a phosphazene structure is then present in an electrolyte solution even after long-term usage, high flame retardancy can be attained over a long period. Additionally, the amount of gases generated at first-time charging can be reduced.

The present exemplary embodiment can provide a nonaqueous-type electrolyte solution having high flame retardancy and a good capacity retention rate, and a device including the nonaqueous-type electrolyte solution.

BRIEF DESCRIPTION OF DRAWINGS

FIG. 1(a) shows a plan diagram of the positive electrode, and FIG. 1(b) shows a side diagram of the positive electrode.

FIG. 2(a) shows a plan diagram of the negative electrode, and FIG. 2(b) shows a side diagram of the negative electrode.

DESCRIPTION OF EMBODIMENTS

Figure 1:
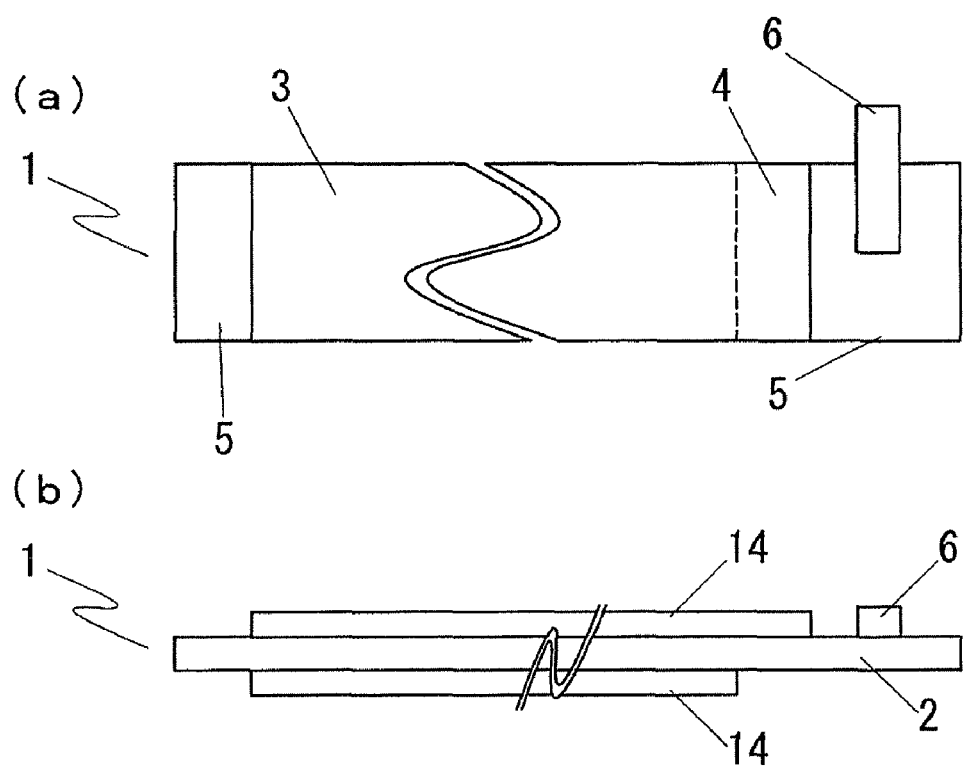
FIG. 1 is a diagram illustrating a constitution of a positive electrode of a lithium ion secondary battery according to the present exemplary embodiment.

Hereinafter, the present exemplary embodiment will be described in detail.

The nonaqueous-type electrolyte solution according to the present exemplary embodiment is one used in a device including a positive electrode, a negative electrode and the nonaqueous-type electrolyte solution, and contains a lithium salt and a compound having a phosphazene structure represented by the following formula (1), and further contains 0.05% by mass or more and 12.0% by mass or less of at least one disulfonate ester selected from a cyclic disulfonate ester represented by the following formula (2) and a chain disulfonate ester represented by the following formula (3) based on the total of the nonaqueous-type electrolyte solution.

[Formula 5]

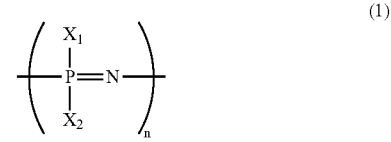

(1)

wherein in the formula (1), $X_1$ and $X_2$ each independently denote a halogen element or a monovalent substituent; the monovalent substituent denotes an alkyl group, an alkoxy group, an aryl group, an acyl group, an aryloxy group, an amino group, an alkylthio group, an arylthio group, a halogenated alkyl group, a halogenated alkoxy group, a halogenated aryl group, a halogenated acyl group, a halogenated aryloxy group, a halogenated amino group, a halogenated alkylthio group, or a halogenated arylthio group; n denotes an integer of 3 or more and 5 or less; and the formula (1) may be cyclic.

[Formula 6]

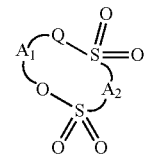

(2)

wherein in the formula (2), Q denotes an oxygen atom, a methylene group or a single bond; $A_1$ denotes a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and $A_2$ denotes a substituted or unsubstituted alkylene group which may be branched.

[Formula 7]

$$R_3-\overset{\overset{O}{\|}}{\underset{\underset{O}{\|}}{S}}-\overset{\overset{R_4}{|}}{\underset{\underset{R_1}{|}}{C}}-\overset{\overset{O}{\|}}{\underset{\underset{O}{\|}}{S}}-R_2 \quad (3)$$

wherein in the formula (3), $R_1$ and $R_4$ each independently denote an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $-SO_2X_{11}$ (wherein $X_{11}$ is a substituted or unsubstituted alkyl group having 1 to 5 carbon atoms), $-SY_{11}$ (wherein $Y_{11}$ is a substituted or unsubstituted alkyl group having 1 to 5 carbon atoms), $-COZ$ (wherein Z is a hydrogen atom or a substituted or unsubstituted alkyl group having 1 to 5 carbon atoms) and a halogen atom; and $R_2$ and $R_3$ each independently denote an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, $-NX_{12}X_{13}$ (wherein $X_{12}$ and $X_{13}$ are each independently a hydrogen atom or a substituted or unsubstituted alkyl group having 1 to 5 carbon atoms) and $-NY_{12}CONY_{13}Y_{14}$ (wherein $Y_{12}$ to $Y_{14}$ are each independently a hydrogen atom or a substituted or unsubstituted alkyl group having 1 to 5 carbon atoms).

As the compound having a phosphazene structure, a compound represented by the above formula (1) is used because of exhibiting flame retardancy. Examples of the compound represented by the above formula (1) include monoethoxypentafluorocyclotriphosphazene. These compounds may be used singly or concurrently in two or more. In the compound having a phosphazene structure represented by the above formula (1), $X_1$ and $X_2$ may be each independently a different group between units.

From the viewpoint of suppressing reductive degradation of the compound having a phosphazene structure, as a cyclic disulfonate ester, a compound represented by the above formula (2) is used; and as a chain disulfonate ester, a compound represented by the above formula (3) is used.

Representative examples of a compound represented by the above formula (2) are specifically shown in Table 1, and representative examples of a compound represented by the above formula (3) are specifically shown in Table 2, but the present exemplary embodiment is not limited thereto. These compounds may be used singly or concurrently in two or more.

TABLE 1

| Compound No. | Chemical Structure |
| --- | --- |
| 1 | 1,5,2,4-dioxadithiane 2,2,4,4-tetraoxide (six-membered ring: O–S(O₂)–CH₂–S(O₂)–O–CH₂–) |
| 2 | cyclic disulfonate with –(CH₂)₂– bridge between the two oxygens |
| 3 | cyclic disulfonate with –(CH₂)₃– bridge between the two oxygens |
| 4 | cyclic disulfonate with CH(CH₃) at methylene position and –(CH₂)₂– bridge |
| 5 | cyclic disulfonate with C(CH₃)₂ between the two S groups and –CH₂– bridge |
| 6 | cyclic disulfonate with CF₂ between the two S groups and –CH₂– bridge |
| 7 | cyclic disulfonate with –CH₂– between the two S groups and C(CH₃)₂ bridge |
| 8 | cyclic disulfonate with C(CH₃)₂ between the two S groups and C(CH₃)₂ bridge |
| 9 | cyclic disulfonate with –CH₂– between the two S groups and C(=O) bridge between the two oxygens |

TABLE 1-continued

| Compound No. | Chemical Structure |
|---|---|
| 10 | (cyclic structure with two SO$_2$ groups, C(CH$_3$)$_2$, and C=O) |
| 11 | (cyclic structure with two SO$_2$ groups, CF$_2$, and C=O) |
| 12 | (six-membered ring with two SO$_2$ groups, CH$_2$, and S=O) |
| 13 | (six-membered ring with two SO$_2$ groups, C(CH$_3$)$_2$, and S=O) |
| 14 | (six-membered ring with two SO$_2$ groups, CF$_2$, and S=O) |
| 15 | (ring with two SO$_2$, CH$_2$, O-CF$_2$-O) |
| 16 | (ring with two SO$_2$, CH$_2$, O-(CF$_2$)$_2$-O) |
| 17 | (larger ring with two SO$_2$, CH$_2$, two CH$_2$, CF$_2$) |
| 18 | (larger ring with two SO$_2$, CH$_2$, O-CH$_2$-O-CH$_2$, H$_2$C, CH$_3$) |

TABLE 1-continued

| Compound No. | Chemical Structure |
|---|---|
| 19 | (ring with two SO$_2$, CH$_2$, F$_3$C, CF$_2$, O-CF$_2$-O) |
| 20 | (ring with two SO$_2$, CH$_2$, H$_2$C, CH$_2$, O-CF$_2$-O) |
| 21 | (six-membered ring with two SO$_2$, O, CH$_2$-CH$_2$) |
| 22 | (five-membered ring with two SO$_2$, CH$_2$, O) |

TABLE 2

| Compound No. | Chemical Structure |
|---|---|
| 101 | CH$_2$(SO$_2$OCH$_3$)$_2$ |
| 102 | CH$_2$(SO$_2$OCH$_2$CH$_3$)$_2$ |
| 103 | CH$_2$(SO$_2$-CH(CH$_3$)$_2$)$_2$ |
| 104 | CH(CH$_3$)(SO$_2$OCH$_3$)$_2$ |

TABLE 2-continued

| Compound No. | Chemical Structure |
|---|---|
| 105 | (CH₃)₂C(SO₂OCH₃)₂ |
| 106 | CH₃SO₂-CH₂-SO₂OCH₂CH₂CH₃ |
| 107 | CH₃SO₂-CH₂-SO₂OCH₂CH₂Cl |
| 108 | CH₃O-CH(SO₂OCH₃)₂ |
| 109 | CF₂(SO₂OCH₃)₂ |
| 110 | HO-SO₂-CH₂-SO₂-OCH₃ |
| 111 | Cl-SO₂-CH₂-SO₂-OCH₂CH₂OH |
| 112 | Cl-SO₂-CH₂-SO₂-OCH₂CH₂OSO₂CH₂SCl |
| 113 | CF₃CF₂O-SO₂-CH₂-SO₂-OCF₂CF₃ |
| 114 | H₂N-SO₂-CH₂-SO₂-NH₂ |
| 115 | H₂N-SO₂-CH₂-SO₂-OC₆H₅ |
| 116 | C₆H₅O-SO₂-CH₂-SO₂-OC₆H₅ |
| 117 | H₂NCONH-SO₂-CH₂-SO₂-NHCONH₂ |
| 118 | O=CH-CH(SO₂OH)₂ |
| 119 | CH₃SO₂-CH(SO₂OC₆H₅)₂ |
| 120 | CH₃CH₂-S-CH(SO₂OC₆H₅)₂ |

The proportion of at least one compound selected from a cyclic disulfonate ester represented by the above formula (2) and a chain disulfonate ester represented by the above formula (3) in a nonaqueous-type electrolyte solution is 0.05% by mass or more and 12% by mass or less based on the total of the nonaqueous-type electrolyte solution. In the case where the proportion is less than 0.05% by mass based on the total of the nonaqueous-type electrolyte solution, the effect of a surface membrane in which the reductive degradation of the compound having a phosphazene structure is suppressed cannot sufficiently be attained. By contrast, if the proportion exceeds 12% by mass based on the total of the nonaqueous-type electrolyte solution, a rise in the viscosity of the non-aqueous-type electrolyte solution and an increase in the resistance associated therewith cannot be suppressed, and battery characteristics cannot be improved further. The proportion is preferably 0.1% by mass or more and 10% by mass or less, and making the proportion in this range can further improve the effect of the surface membrane.

The nonaqueous-type electrolyte solution according to the present embodiment can reduce the amount of gases generated at first-time charging, which is preferable also from the viewpoint of the safety. This is conceivably because the concurrent presence of a compound having a phosphazene structure and a disulfonate ester in a nonaqueous electrolyte solution in the proportion described above can form an SEI incorporating the compound having a phosphazene structure by a reaction mechanism different from the SEI formation by a nonaqueous electrolyte solution containing only a disulfonate ester.

In the nonaqueous-type electrolyte solution according to the present exemplary embodiment, part of the disulfonate ester contained in the nonaqueous-type electrolyte solution is preferably substituted with a sultone compound represented by the following formula (4).

[Formula 8]

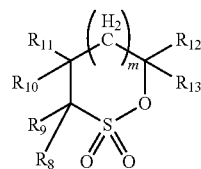

(4)

wherein in the formula (4), $R_8$ to $R_{13}$ each independently denote an hydrogen atom or a group selected from a hydrogen atom, an alkyl group having 1 or more and 12 or fewer carbon atoms, a cycloalkyl group having 3 or more and 6 or fewer carbon atoms, and an aryl group having 6 or more and 12 or fewer carbon atoms; and m denotes an integer of 0 or more and 2 or less.

As a sultone compound represented by the above formula (4), 1,3-propanesultone, 1,4-butanesultone and derivatives thereof can be used, for example, but are not limited thereto. These compounds may be used singly or concurrently in two or more.

The nonaqueous-type electrolyte solution preferably contains 3.0% by mass or more and 20.0% by mass or less of the compound having a phosphazene structure based on the total of the nonaqueous-type electrolyte. Incorporation of 3.0% by mass or more of a compound having a phosphazene structure based on the total of a nonaqueous-type electrolyte solution can provide a sufficient flame retardancy effect; and incorporation of 20.0% by mass or less thereof can suppress a decrease in the ionic conductivity.

The nonaqueous-type electrolyte solution may be a gel electrolyte gelated with a polymer.

The nonaqueous-type electrolyte solution according to the present exemplary embodiment may contain an aprotic solvent. Examples of the aprotic solvent include cyclic carbonates such as propylene carbonate (PC), ethylene carbonate (EC), butylene carbonate (BC) and vinylene carbonate (VC), chain carbonates such as dimethyl carbonate (DMC), diethyl carbonate (DEC), ethyl methyl carbonate (EMC) and dipropyl carbonate (DPC), aliphatic carboxylate esters such as methyl formate, methyl acetate and ethyl propionate; γ-lactones such as γ-butyrolactone, chain ethers such as 1,2-ethoxyethane (DEE) and ethoxymethoxyethane (EME), cyclic ethers such as tetrahydrofuran and 2-methyltetrahydrofuran; dimethyl sulfoxide, 1,3-dioxolane, formamide, acetamide, dimethylformamide, dioxolane, acetonitrile, propylnitrile, nitromethane, ethylmonoglyme, phosphate triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, anisole, N-methylpyrrolidone, and fluorocarboxylate esters. These aprotic organic solvents can be used singly or as a mixture of two or more, but are not limited thereto.

Examples of the lithium salt contained in the nonaqueous-type electrolyte solution according to the present exemplary embodiment as an electrolyte include $LiPF_6$, $LiBF_4$, $LiAsF_6$, $LiSbF_6$, $LiClO_4$, $LiAlCl_4$, $LiN(C_qF_{2q+1}SO_2)(C_rF_{2r+1}SO_2)$ (q and r are natural numbers), and $LiCF_3SO_3$. But the lithium salt is not limited thereto.

As a negative electrode active material contained in a negative electrode of a device having the nonaqueous-type electrolyte solution according to the present exemplary embodiment, one or two or more materials can be used which are selected from the group consisting of, for example, metallic lithium, lithium alloys and materials capable of absorbing and releasing lithium ions. As the material capable of absorbing and releasing lithium ions, a carbon material, or a silicon and an oxide can be used.

As the carbon material, graphite, amorphous carbon, diamond-like carbon, carbon nanotubes and the like to absorb lithium, and composite materials thereof can be used. Particularly graphite has a high electron conductivity, is excellent in the adhesivity with a current collector including a metal such as copper, and the voltage flatness, and contains only a low content of impurities because of being formed at a high treatment temperature, which are preferably advantageous for improvement of the negative electrode performance. Further, a composite material of a high-crystalline graphite and a low-crystalline amorphous carbon, and the like can also be used.

As the silicon and the oxide, one of silicon, silicon oxide, tin oxide, indium oxide, zinc oxide, lithium oxide, phosphoric acid and boric acid, or a composite thereof may be used, and the composite preferably contains especially silicon oxide. The structure is preferably in an amorphous state. This is because silicon oxide is stable and causes no reaction with other compounds, and because the amorphous structure introduces no deteriorations caused by non-uniformity such as crystal grain boundaries and defects. As a film-formation method, a vapor-deposition method, a CVD method, a sputtering method and the like can be used.

The lithium alloy is constituted of lithium and metals alloyable with lithium. For example, the lithium alloy is constituted of a binary, ternary, or more multi-metal alloy of metals such as Al, Si, Pb, Sn, In, Bi, Ag, Ba, Ca, Hg, Pd, Pt, Te, Zn and La, with lithium. Metallic lithium and lithium alloys are especially preferably in an amorphous state. This is because the amorphous structure hardly causes deteriorations caused by non-uniformity such as crystal grain boundaries and defects.

Metallic lithium and lithium alloys can be suitably formed by a system such as a melt cooling system, a liquid quenching system, an atomizing system, a vacuum vapor-deposition system, a sputtering system, a plasma CVD system, an optical CVD system, a thermal CVD system and a sol-gel system.

Examples of a positive electrode active material contained in a positive electrode of a device having the nonaqueous-type electrolyte solution according to the present exemplary embodiment include lithium-containing composite oxides such as $LiCoO_2$, $LiNiO_2$ and $LiMn_2O_4$. A transition metal part of the lithium-containing composite oxides may be replaced by another element.

A lithium-containing composite oxide having a plateau of 4.5 V or higher vs. a counter electrode potential of metallic lithium may be used. Examples of the lithium-containing composite oxide include a spinel-type lithium-manganese composite oxide, an olivine-type lithium-containing composite oxide and an inverse-spinel-type lithium-containing composite oxide. An example of the lithium-containing composite oxide includes a compound represented by $Li_a(M_xMn_{2-x})O_4$ (here, 0<x<2; and 0<a<1.2. M is at least one selected from the group consisting of Ni, Co, Fe, Cr and Cu).

Examples of a gelling component used as a raw material of a polymer contained in a gel electrolyte in the present exemplary embodiment include monomers, oligomers and copolymerized oligomers having two or more thermopolymerizable polymerization groups in one molecule thereof. Examples of the gelling component include compounds to form acrylic polymers, including difunctional acrylates such as ethylene glycol diacrylate, diethylene glycol diacrylate, triethylene glycol diacrylate, tetraethylene glycol diacrylate, propylene diacrylate, dipropylene diacrylate, tripropylene diacrylate, 1,3-butanediol diacrylate, 1,4-butanediol diacrylate and 1,6-hexanediol diacrylate, trifunctional acrylates such as trimethylolpropane triacrylate and pentaerythritol triacrylate, tetrafunctional acrylates such as ditrimethylolpropane tetraacrylate and pentaerythritol tetraacrylate, and methacrylate monomers. In addition thereto, the examples include monomers such as urethane acrylates and urethane methacrylates, copolymerized oligomers thereof, and copolymerized oligomers with acrylonitrile, but are not limited thereto.

As the polymer, polymers dissolved in a plasticizer and capable of gelation, such as polyvinylidene fluoride, polyethylene oxide and polyacrylonitrile can also be used.

The gelling component is not limited to above-mentioned monomers, oligomers and polymers, and components can be used as long as being capable of gelation. The gelling component is not limited to one kind of a monomer, an oligomer or a polymer, but mixtures of two to several kinds of gelling components may be used according to needs. As thermopolymerization initiators, benzoins, peroxides and the like can be used according to needs, but thermopolymerization initiators are not limited thereto.

In a battery constitution of the device according to the present exemplary embodiment, as an electrode element, a laminated body or a wound body can be used; and as an outer packing body, an aluminum laminate outer packing body or a metal outer packing body can be used. Further, the battery capacity is not limited. The device of the present exemplary embodiment is a lithium ion secondary battery, a capacitor or the like, and the nonaqueous-type electrolyte solution according to the present exemplary embodiment can be utilized for the lithium ion secondary battery, the capacitor and the like.

EXAMPLES

Hereinafter, the present embodiment will be described in detail by way of Examples by reference to drawings, but the present embodiment is not limited to the Examples.

FIG. 1 is a diagram illustrating a constitution of a positive electrode of a lithium ion secondary battery. FIG. 1(a) shows a plan diagram of the positive electrode, and FIG. 1(b) shows a side diagram of the positive electrode.

Figure 2:
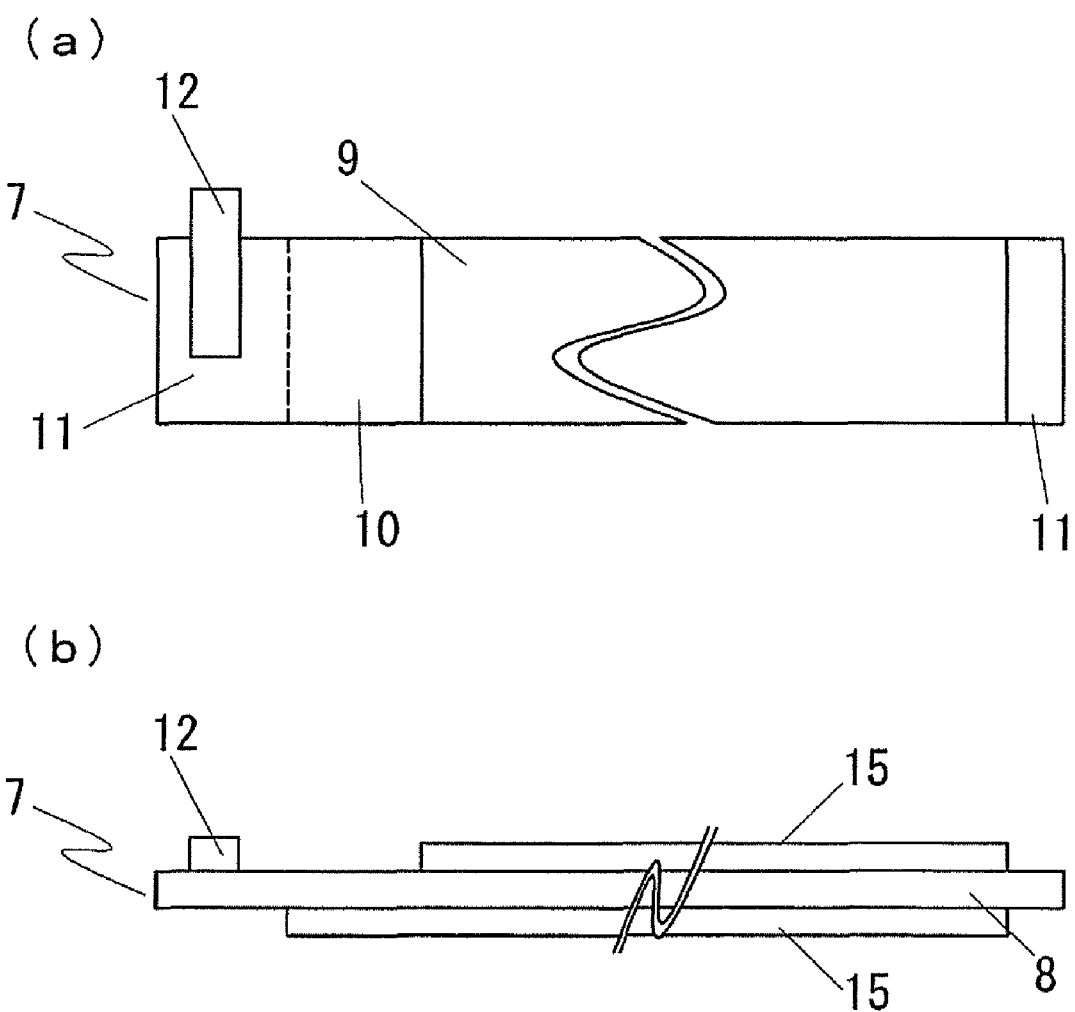
FIG. 2 is a diagram illustrating a constitution of a negative electrode of the lithium ion secondary battery according to the present exemplary embodiment.

FIG. 2 is a diagram illustrating a constitution of a negative electrode of the lithium ion secondary battery. FIG. 2(a) shows a plan diagram of the negative electrode, and FIG. 2(b) shows a side diagram of the negative electrode.

Figure 3:
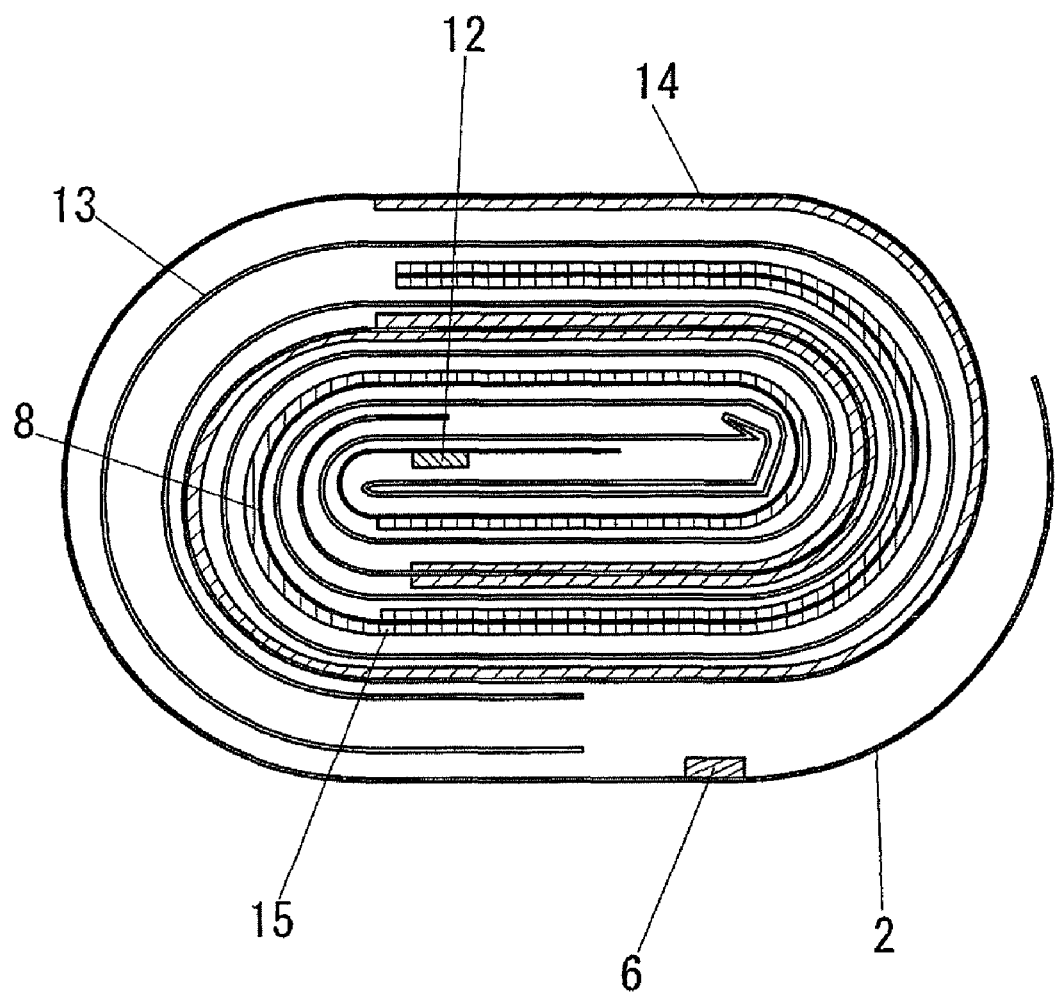
FIG. 3 is a cross-sectional diagram illustrating a constitution of a battery element after being wound of the lithium ion secondary battery according to the present exemplary embodiment.

FIG. 3 is a cross-sectional diagram illustrating a constitution of a battery element after being wound of the lithium ion secondary battery.

Example 1

First, fabrication of a positive electrode 1 will be described by way of FIG. 1. 85% by mass of $LiMn_2O_4$, 7% by mass of an acetylene black as a conductive auxiliary agent and 8% by mass of a polyvinylidene fluoride as a binder were mixed; and N-methylpyrrolidone was added to the mixture, and further mixed to thereby fabricate a positive electrode slurry. The positive electrode slurry was applied on both surfaces of an Al foil 2 having a thickness of 20 μm to become a current collector by a doctor blade method so that the thickness after roll pressing became 160 μm, dried at 120° C. for 5 min, and thereafter subjected to a roll pressing step to thereby form positive electrode active material layer 14. Positive electrode active material-unapplied parts 5, on which no positive electrode active material was applied, were provided on both end portions of the foil. A positive electrode conductive tab 6 was welded on one of the positive electrode active material-unapplied parts 5. A positive electrode active material-one surface-applied part 4, which was one surface having the positive electrode active material applied only onto the one surface, was provided adjacent to the positive electrode active material-unapplied part 5 to which the positive electrode conductive tab 6 was welded, and positive electrode active material-both surface-applied parts 3 were provided further adjacent thereto. A positive electrode 1 was thus fabricated.

Then, fabrication of a negative electrode 7 will be described by way of FIG. 2. 90% by mass of a graphite, 1% by mass of an acetylene black as a conductive auxiliary agent and 9% by mass of a polyvinylidene fluoride as a binder were mixed; and N-methylpyrrolidone was added to the mixture, and further mixed to thereby fabricate a negative electrode slurry. The negative electrode slurry was applied on both surfaces of a Cu foil 8 having a thickness of 10 μm to become a current collector by a doctor blade method so that the thickness after roll pressing became 120 μm, dried at 120° C. for 5 min, and thereafter subjected to a roll pressing step to thereby form negative electrode active material-applied parts 9. Negative electrode active material-unapplied parts 11, on which no negative electrode active material was applied, were provided on both end portions of the foil. A negative electrode conductive tab 12 was welded to one of the end portions. A negative electrode active material-one surface-applied part 10, which was one surface having the negative electrode active material applied only onto the one surface, was provided adjacent to the negative electrode active material-unapplied part 11 to which the negative electrode conductive tab 12 was welded, and negative electrode active material-both surface-applied parts 9 were provided further adjacent thereto. A negative electrode 7 was thus fabricated.

Fabrication of a battery element will be described by way of FIG. 3. A fused and cut portion of two sheets of a separator 13 including a polypropylene microporous membrane having a membrane thickness of 25 μm and a porosity of 55% and subjected to a hydrophilicizing treatment was fixed and wound to a winding core of a winding apparatus, and front ends of the positive electrode 1 and the negative electrode 7 were introduced. The negative electrode 7 was disposed between the two sheets of the separator 13, and the positive electrode 1 was disposed on the upper surface of the separator 13, with the opposite side of the connection part of the positive electrode conductive tab 6 and the connection part side of the negative electrode conductive tab 12 made as front end sides of the positive electrode 1 and the negative electrode 7, respectively, and wound by rotating the winding core to thereby form a battery element (hereinafter, referred to as a J/R (jelly roll)).

The J/R was accommodated in an embossed laminate outer packing body; the positive electrode conductive tab 6 and the negative electrode conductive tab 12 were pulled out; and one side of the laminate outer packing body was folded back, and thermally fused with a portion for solution injection being left unfused.

An electrolyte solution was fabricated by mixing 10% by mass of monoethoxypentafluorocyclotriphosphazene and 2% by mass of a compound No. 2 in Table 1 in the electrolyte solution containing 1.2 mol/l of $LiPF_6$ as a supporting salt and ethylene carbonate (EC)/diethyl carbonate (DEC)=30/70 (volume ratio) as a solvent.

Then, the electrolyte solution was injected from a portion for solution injection for vacuum impregnation, and the portion for solution injection was thermally fused to thereby obtain a battery.

A discharge capacity acquired when the obtained battery was CC-CV charged (constant-current constant-voltage charge, charge conditions: a CC current of 0.02 C, a CV time of 5 hours, and a temperature of 20° C.) to a battery voltage of 4.2 V, and thereafter discharged at 0.02 C to a battery voltage of 3.0 V was defined as an initial capacity; and the proportion of the acquired initial capacity to a design capacity was defined as an initial capacity (%), which was measured.

The proportion of a 2 C capacity to a 0.2 C capacity at 20° C. of the obtained battery was defined as rate characteristics (%), which was measured.

A cycle test of the obtained battery involved CC-CV charge of an upper-limit voltage of 4.2 V, a current of 1 C, and a CV time of 1.5 hours, and CC discharge of a lower-limit voltage of 3.0 V, a current of 1 C, and either was carried out at 45° C. The proportion of a discharge capacity at 1000th cycle to a discharge capacity at the first cycle was defined as a capacity retention rate, which was measured.

A combustion test was carried out by placing a battery after the cycle test 10 cm above the tip end of a flame of a gas burner. The combustibility was rated as follows from the state of an electrolyte solution solvent volatilizing and burning. A case where the electrolyte solution was not ignited was defined as A; a case where even if ignition was caused, the fire extinguished 2 to 3 sec after the ignition was defined as B; a case where even if ignition was caused, the fire extinguished within 10 sec was defined as C; and a case where burning continued without extinction even after 10 sec had elapsed was defined as D.

Example 2

In Example 2, a battery was fabricated and evaluated in the same manner as in Example 1, except for mixing 2% by mass of a compound No. 101 in Table 2 as an additive.

Example 3

In Example 3, a battery was fabricated and evaluated as in Example 1, except for mixing 4% by mass of a compound No. 101 in Table 2 as an additive.

Example 4

In Example 4, a battery was fabricated and evaluated as in Example 1, except for mixing 2% by mass of a compound No. 2 in Table 1 and 2% by mass of a compound No. 101 in Table 2 as additives.

Example 5

In Example 5, a battery was fabricated and evaluated as in Example 1, except for mixing 2% by mass of a compound No. 2 in Table 1 and 3% by mass of 1,3-propanesultone as additives.

Example 6

In Example 6, a battery was fabricated and evaluated as in Example 1, except for mixing 4% by mass of a compound No. 2 in Table 1 and 6% by mass of 1,3-propanesultone as additives.

Example 7

In Example 7, a battery was fabricated and evaluated as in Example 6, except for adding 20% by mass of monoethoxypentafluorocyclotriphosphazene.

Example 8

In Example 8, a battery was fabricated and evaluated as in Example 7, except for adding 25% by mass of monoethoxypentafluorocyclotriphosphazene.

Example 9

In Example 9, a battery was fabricated and evaluated as in Example 1, except for mixing 5% by mass of a compound No. 2 in Table 1 and 7% by mass of 1,3-propanesultone as additives.

Comparative Example 1

In Comparative Example 1, a battery was fabricated and evaluated as in Example 6, except for not adding monoethoxypentafluorocyclotriphosphazene.

Comparative Example 2

In Comparative Example 2, a battery was fabricated and evaluated as in Example 1, except for adding no additive.

Comparative Example 3

In Comparative Example 3, a battery was fabricated and evaluated as in Example 1, except for adding 5% by mass of a vinylene carbonate (VC) not corresponding to any of the above formulas (2), (3) and (4) as an additive.

Comparative Example 4

In Comparative Example 4, a battery was fabricated and evaluated as in Example 1, except for mixing 3% by mass of 1,3-propanesultone (PS) as an additive.

The results of the initial capacities, the rate characteristics, the capacity retention rates and the flame retardany in Examples 1 to 9 and Comparative Examples 1 to 4 are shown in Table 3.

By comparison of Examples 8 and 7, since an amount of monoethoxypentafluorocyclotriphosphazene added exceeding 20% by mass decreases the ionic conductivity of an electrolyte solution, the rate characteristics slightly decrease, and since the phosphazene compound in an excessive amount for the SEI was reductively degraded gradually in a long-term cycle test, the combustion suppressing effect of a battery after the long-term cycle test resulted in a slight decrease.

Further by comparison with each Comparative Example, in Examples, the amount of gases generated was likely to decrease at first-time charging. This is conceivably because the concurrent presence of a compound having a phosp-

TABLE 3

| | Negative Electrode Active Material/ Electrolyte | Amount of Phosphazene Compound Added (% by mass) | Additive | Amount of Additive Added (% by mass) | Initial Capacity (%) | Rate Characteristics (%) at 2 C/ 0.2 C Capacity | Capacity retention rate (%) at 1000th Cycle | Combustibility |
|---|---|---|---|---|---|---|---|---|
| Example 1 | graphite/liquid | 10 | No. 2 | 2 | 90 | 78 | 70 | B |
| Example 2 | graphite/liquid | 10 | No. 101 | 2 | 90 | 78 | 70 | B |
| Example 3 | graphite/liquid | 10 | No. 101 | 4 | 88 | 76 | 73 | A |
| Example 4 | graphite/liquid | 10 | No. 2/No. 101 | 4 | 86 | 75 | 72 | A |
| Example 5 | graphite/liquid | 10 | No. 2/PS | 5 | 89 | 77 | 74 | A |
| Example 6 | graphite/liquid | 10 | No. 2/PS | 10 | 82 | 65 | 75 | A |
| Example 7 | graphite/liquid | 20 | No. 2/PS | 10 | 79 | 60 | 68 | A |
| Example 8 | graphite/liquid | 25 | No. 2/PS | 10 | 75 | 55 | 58 | B |
| Example 9 | graphite/liquid | 10 | No. 2/PS | 12 | 74 | 54 | 75 | A |
| Comparative Example 1 | graphite/liquid | 0 | No. 2/PS | 5 | 89 | 82 | 75 | D |
| Comparative Example 2 | graphite/liquid | 10 | — | — | 71 | 88 | 38 | D |
| Comparative Example 3 | graphite/liquid | 10 | VC | 5 | 85 | 58 | 61 | C |
| Comparative Example 4 | graphite/liquid | 10 | PS | 3 | 92 | 59 | 68 | C |

No. 2 described in the column Additive in Table 3 indicates compound No. 2 in Table 1; No. 101, compound No. 101 in Table 2; PS, 1,3-propanesultone; and VC, a vinylene carbonate not corresponding to any of the above formulas (2), (3) and (4).

As shown in Examples 1 to 6 and 9 in Table 3, in the case where the amount of monoethoxypentafluorocyclotriphosphazene added was made a fixed amount, and the amount of an additive(s) was increased, the capacity retention rate was very good. Further in the combustion test of the battery after the cycle test, the electrolyte solution was not ignited, or although ignition was caused, the fire went out 2 to 3 sec after the ignition. By contrast, in Comparative Example 1, in the combustion test of the battery after the cycle test, the electrolyte solution continued to burn. In Comparative Example 2, the capacity retention rate was low, and further in the combustion test of the battery after the cycle test, the electrolyte solution continued to burn. That is, it was found that a compound having a phosphazene structure was reductively degraded because of the absence of an additive, and an amount thereof effective for combustion suppression became not present. Also in Comparative Example 3 and Comparative Example 4, the flame retardancy decreased slightly as compared with Examples, indicating that the additives were insufficient in order to suppress the reductive degradation of a compound having a phosphazene structure. From Examples 6, 7 and 9, although there was a possibility that a large amount of an additive(s) added made the SEI thick and the resistance increased, it was found that especially the combustion suppressing effect was sufficiently sustained also after the cycle test.

hazene structure and a disulfonate ester in a nonaqueous electrolyte solution could form an SEI incorporating part of the compound having a phosphazene structure by a reaction mechanism different from the SEI formation by a nonaqueous electrolyte solution containing only a disulfonate ester. However, it is presumed that because further reduction of the phosphazene compound present in an electrolyte solution could be suppressed on the SEI thus formed, there was a possibility that the SEI by the disulfonate ester incorporating the phosphazene compound had a larger reductive degradation suppressing effect on some electrolyte solution components containing the phosphazene compound. It is presumed that the effect made the life characteristics good.

From the above, an SEI using a specific disulfonate ester and a specific sultone compound could suppress the reductive degradation of a compound having a phosphazene structure over a long period, and provide a good capacity retention rates as life characteristics, and could consequently provide high flame retardancy. Further, making best the balance between the amount of a compound having a phosphazene structure added and the amount of an additive(s) could maintain the rate characteristics and provide good life characteristics.

Example 10

Example 10 was carried out in the same manner as in Example 5, except for using the electrolyte solution in Example 5 as a gel electrolyte. First, 10% by mass of monoethoxypentafluorocyclotriphosphazene, 2% by mass of a compound No. 2 in Table 1 and 3% by mass of PS were mixed in an electrolyte solution containing 1.2 mol/l of $LiPF_6$ and in which EC/DEC=30/70 (volume ratio). 3.8% by mass of triethylene glycol diacrylate and 1% by mass of trimethylol propane triacrylate as gelling agents were further added and well mixed. Thereafter, 0.5% by mass of t-butyl peroxypivalate as a polymerization initiator was added. A pregel solution was thus fabricated. Then, the pregel solution was injected from a portion for solution injection for vacuum impregnation, and polymerized at 80° C. for 2 hours to thereby obtain a lithium ion battery (lithium polymer battery).

Comparative Example 5

Comparative Example 5 was carried out in the same manner as in Example 10, except for adding no additive in Example 10.

The results of the initial capacities, the rate characteristics, the capacity retention rates and the flame retardancy in Example 10 and Comparative Example 5 are shown in Table 4.

thickness after roll pressing became 80 μm, dried at 120° C. for 5 min, thereafter subjected to a roll pressing step, and additionally dried at 300° C. for 10 min to thereby form negative electrode active material-applied parts 9.

Comparative Example 6

Comparative Example 6 was carried out in the same manner as in Example 11, except for adding no additive in Example 11. Cycle tests of Example 11 and Comparative Example 6 involved CC-CV charge (upper-limit voltage: 4.2 V, current: 1 C, and CV time: 1.5 hours), and CC discharge (lower-limit voltage: 3.0 V, and current: 1 C), and both were carried out at 45° C. The proportion of a discharge capacity at

TABLE 4

| | Negative Electrode Active Material/ Electrolyte | Amount of Phosphazene Compound Added (% by mass) | Additive | Amount of Additive Added (% by mass) | Initial Capacity (%) | Rate Characteristics (%) at 2 C/ 0.2 C Capacity | Capacity retention rate (%) at 1000th Cycle | Combustibility |
|---|---|---|---|---|---|---|---|---|
| Example 10 | graphite/polymer | 10 | No. 2/PS | 5 | 89 | 75 | 76 | A |
| Comparative Example 5 | graphite/polymer | 10 | — | — | 72 | 75 | 40 | C |

No. 2 described in the column Additive in Table 4 indicates compound No. 2 in Table 1; and PS, 1,3-propanesultone.

As is clear from Table 4, also in the case of using a gel electrolyte in place of a liquid electrolyte solution, SEI by a disulfonate ester and a sultone compound could suppress the 200th cycle to a discharge capacity at the first cycle was defined as a capacity retention rate.

The results of the initial capacities, the rate characteristics, the capacity retention rates and the flame retardancy in Example 11 and Comparative Example 6 are shown in Table 5.

TABLE 5

| | Negative Electrode Active Material/ Electrolyte | Amount of Phosphazene Compound Added (% by mass) | Additive | Amount of Additive Added (% by mass) | Initial Capacity (%) | Rate Characteristics (%) at 2 C/ 0.2 C Capacity | Capacity retention rate (%) at 1000th Cycle | Combustibility |
|---|---|---|---|---|---|---|---|---|
| Example 11 | silicon/liquid | 10 | No. 2/PS | 10 | 76 | 70 | 71 | B |
| Comparative Example 6 | silicon/liquid | 10 | — | — | 66 | 70 | 33 | D | reductive degradation of a compound having a phosphazene structure over a long period, and could provide a good capacity retention rate as life characteristics, resulting in providing high flame retardancy.

Example 11

Example 11 was carried out in the same manner as in Example 6, except for altering the graphite as the negative electrode material in Example 6 to a silicon-based material. First, 90% by mass of a silicon, 1% by mass of an acetylene black as a conductive auxiliary agent and 9% by mass of a polyimide as a binder were mixed; and N-methylpyrrolidone was added to the mixture, and further mixed to thereby fabricate a negative electrode slurry. The negative electrode slurry was applied on both surfaces of a Cu foil 8 having a thickness of 10 μm to become a current collector so that the No. 2 described in the column Additive in Table 5 indicates compound No. 2 in Table 1; and PS, 1,3-propanesultone.

As is clear from Table 5, also in the case of using a silicon material in place of a graphite, SEI by a disulfonate ester and a sultone compound could suppress the reductive degradation of a compound having a phosphazene structure, and could provide a good capacity retention rate as life characteristics, resulting in providing high flame retardancy.

Hitherto, it was confirmed that the present exemplary embodiment could provide a nonaqueous-type electrolyte solution having a good capacity retention rate and high flame retardancy, and a device including the nonaqueous-type electrolyte solution.

The present application claims the priority to Japanese Patent Application No. 2009-247185, filed on Oct. 28, 2009, the disclosure of which is all incorporated herein.

Hitherto, the present invention has been described by reference to the embodiment (and Examples), but the present invention is not limited to the embodiment (and the Examples). In the constitution and the detail of the present invention, various changes and modifications understandable to those skilled in the art may be made within the scope of the present invention.

Reference Signs List

1 Positive Electrode
2 Al Foil
3 Positive Electrode Active Material-Both Surface-Applied Part
4 Positive Electrode Active Material-One Surface-Applied Part
5 Positive Electrode Active Material-Unapplied Part
6 Positive Electrode Conductive Tab
7 Negative Electrode
8 Cu Foil
9 Negative Electrode Active Material-Both Surface-Applied Part
10 Negative Electrode Active Material-One Surface-Applied Part
11 Negative Electrode Active Material-Unapplied Part
12 Negative Electrode Conductive Tab
13 Separator
14 Positive Electrode Active Material Layer
15 Negative Electrode Active Material Layer

The invention claimed is:

1. A nonaqueous-type electrolyte solution used in a device comprising a positive electrode, a negative electrode and the nonaqueous-type electrolyte solution,
the nonaqueous-type electrolyte solution comprising a lithium salt and a compound having a phosphazene structure represented by the following formula (1), and further comprising 0.05% by mass or more and 12.0% by mass or less of at least one disulfonate ester selected from a cyclic disulfonate ester represented by the following formula (2) and a chain disulfonate ester represented by the following formula (3) based on the total of the nonaqueous-type electrolyte solution:

[Formula 1]

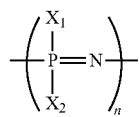

(1)

wherein in the formula (1), $X_1$ and $X_2$ each independently denote a halogen element or a monovalent substituent; the monovalent substituent denotes an alkyl group, an alkoxy group, an aryl group, an acyl group, an aryloxy group, an amino group, an alkylthio group, an arylthio group, a halogenated alkyl group, a halogenated alkoxy group, a halogenated aryl group, a halogenated acyl group, a halogenated aryloxy group, a halogenated amino group, a halogenated alkylthio group, or a halogenated arylthio group; n denotes an integer of 3 or more and 5 or less; and the formula (1) may be cyclic;

[Formula 2]

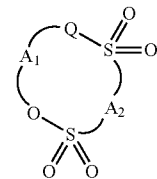

(2)

wherein in the formula (2), Q denotes an oxygen atom, a methylene group or a single bond; $A_1$ denotes a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and $A_2$ denotes a substituted or unsubstituted alkylene group which may be branched, a fluoromethylene group or an oxygen atom;

[Formula 3]

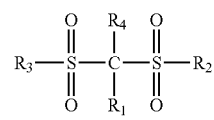

(3)

wherein in the formula (3), $R_1$ and $R_4$ each independently denote an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $-SO_2X_{11}$ (wherein $X_{11}$ is a substituted or unsubstituted alkyl group having 1 to 5 carbon atoms), $-SY_{11}$ (wherein $Y_{11}$ is a substituted or unsubstituted alkyl group having 1 to 5 carbon atoms), $-COZ$ (wherein Z is a hydrogen atom or a substituted or unsubstituted alkyl group having 1 to 5 carbon atoms) and a halogen atom; and $R_2$ and $R_3$ each independently denote an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, $-NX_{12}X_{13}$ (wherein $X_{12}$ and $X_{13}$ are each independently a hydrogen atom or a substituted or unsubstituted alkyl group having 1 to 5 carbon atoms) and $-NY_{12}CONY_{13}Y_{14}$ (wherein $Y_{12}$ to $Y_{14}$ are each independently a hydrogen atom or a substituted or unsubstituted alkyl group having 1 to 5 carbon atoms), wherein part of the disulfonate ester contained in the nonaqueous-type electrolyte solution is substituted with a sultone compound represented by the following formula (4):

[Formula 4]

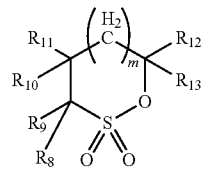

(4)

wherein in the formula (4), $R_8$ to $R_{13}$ each independently denote an atom or a group selected from a hydrogen atom, an alkyl group having 1 or more and 12 or fewer carbon atoms, a cycloalkyl group having 3 or more and 6 or fewer carbon atoms, and an aryl group having 6 or more and 12 or fewer carbon atoms; and m denotes an integer of 0 or more and 2 or less.

2. The nonaqueous-type electrolyte solution according to claim 1, comprising 3.0% by mass or more and 20.0% by mass or less of the compound having a phosphazene structure based on the total of the nonaqueous-type electrolyte solution.

3. The nonaqueous-type electrolyte solution according to claim 1, wherein the nonaqueous-type electrolyte solution is gelated with a polymer.

4. A device, being a lithium ion secondary battery or a capacitor, the device comprising a nonaqueous-type electrolyte solution according to claim 1.

\* \* \* \* \*